United States Patent

Crewson et al.

[11] Patent Number: 5,131,163
[45] Date of Patent: Jul. 21, 1992

[54] MOUNTING GAGE FOR SLACK ADJUSTER

[75] Inventors: Gary Crewson, Orchard Park, N.Y.; Darryl F. Dimond, Niagara Falls, Canada

[73] Assignee: Crewson Brunner, Inc., Buffalo, N.Y.

[21] Appl. No.: 780,769

[22] Filed: Oct. 22, 1991

[51] Int. Cl.$^5$ .............................. G01D 21/00
[52] U.S. Cl. ........................ 33/609; 33/600
[58] Field of Search ............... 33/600, 603, 609, 610; 188/196 R; 116/79.51, 208

[56] References Cited

U.S. PATENT DOCUMENTS

| | | | |
|---|---|---|---|
| 1,281,628 | 10/1918 | Mix | 33/600 |
| 1,891,185 | 12/1932 | Miller et al. | 33/610 |
| 1,981,751 | 11/1934 | Passler | 33/609 |
| 2,821,788 | 2/1958 | Wenot | 33/600 |
| 3,618,219 | 11/1971 | Kelly | 33/609 |
| 4,208,798 | 6/1980 | Sampson | 33/609 |
| 4,800,991 | 1/1989 | Miller | 116/208 |

OTHER PUBLICATIONS

Midland Brochure, L31044, Jun.-1988 no date.
Kelsey Brochure, Form No. 10481101 no date.

Primary Examiner—Thomas B. Will
Attorney, Agent, or Firm—Bean, Kauffman & Spencer

[57] ABSTRACT

A gage for use in mounting a slack adjuster having one end having an opening adapted to removably couple the slack adjuster to a brake control shaft and an opposite end having an opening adapted to removably receive a bearing pin for rotatably coupling the slack adjuster to a clevis adjustably mounted on a brake actuating push rod, wherein the gage includes an elongated body having first and second ends, the first end having a first bearing surface adapted to engage with an outer surface of the control shaft, and the second end having a second bearing surface adapted for engagement with the bearing pin and an indicator for indicating when the position of the clevis lengthwise of the push rod provides a given angle between an axis extending lengthwise of the push rod and a line drawn through centers of the control shaft and the bearing pin.

20 Claims, 2 Drawing Sheets

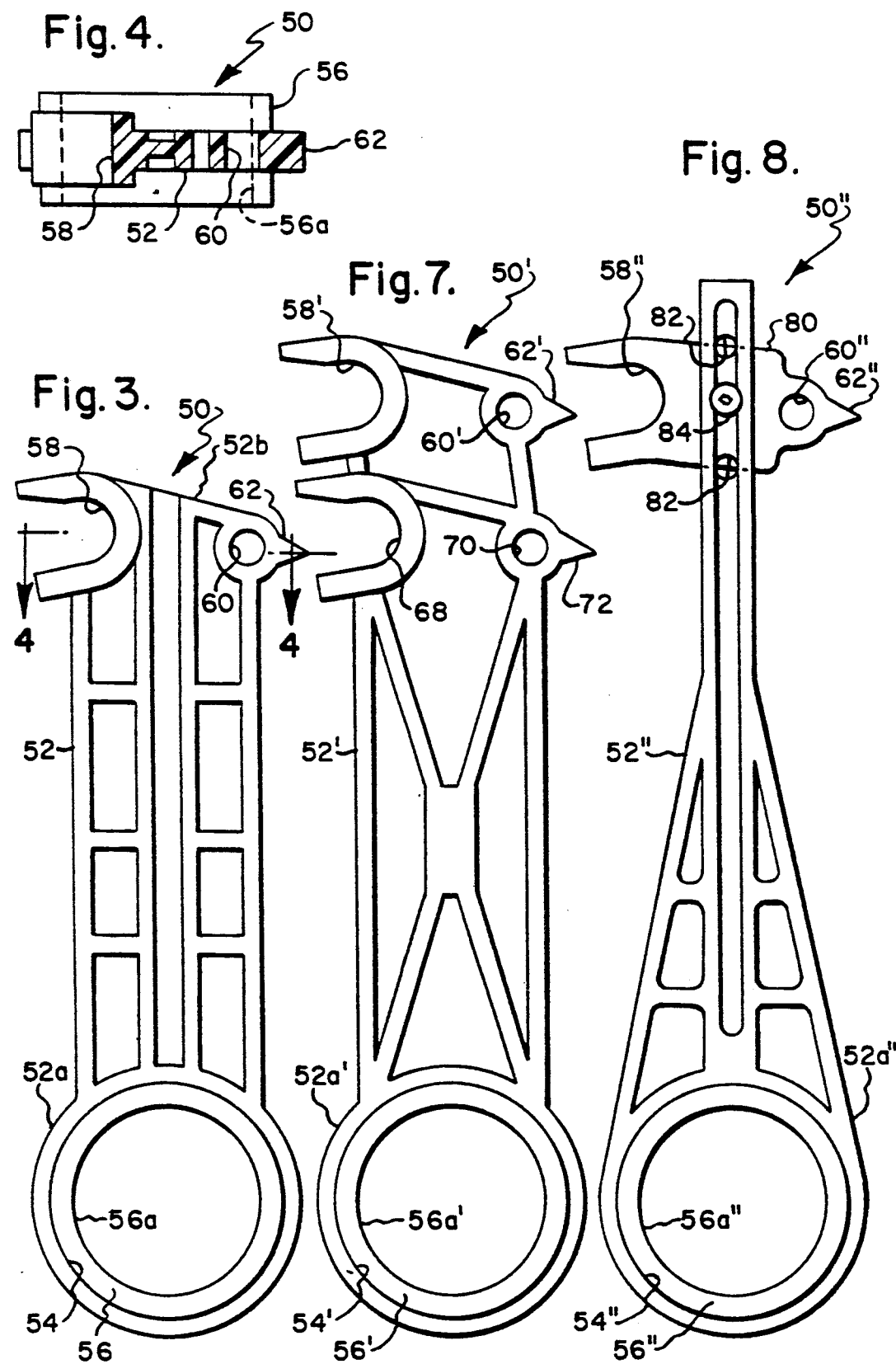

MOUNTING GAGE FOR SLACK ADJUSTER

BACKGROUND OF THE INVENTION

Slack adjusters, and in particular, automatic slack adjusters, are required to be accurately positioned when installed in order to permit properly controlled operation of a vehicle's brakes with which the adjusters are operably associated.

A typical automatic slack adjuster has an elongated body having one end fitted with means for removably coupling the adjuster for rotation with a brake control shaft and an opposite end having an opening for removably receiving a bearing pin carried by a clevis adjustably mounted on a brake actuating push rod, and an adjustment link having one end slidably supported by the body and an opposite end formed with a bore opening for removably receiving a connecting pin carried by the clevis. In mounting of the slack adjuster, care must be exercised to ensure that a line drawn axially of the push rod and through centers of openings of the clevis, which receive the bearing and connecting pins, is disposed at a predetermined angle relative to a line drawn through the centers of the opening formed in the opposite end of the adjuster body and the brake control shaft, as determined by system operating requirements.

Heretofore, it has been proposed to employ plate-like gages as an aid to the accurate installation of slack adjusters. However, presently available gages are difficult to use in that they rely on a user's steady hand and sight to achieve proper positioning of the centers of the clevis openings relative to the center of the brake control shaft, and their use ofttimes results in faulty installations.

SUMMARY OF THE INVENTION

The present invention is directed towards a gage for use in accurately mounting a slack adjuster.

The gage of the present invention includes an elongated body having a first end formed with a first bearing surface adapted to be rotatably coupled to a brake control shaft upon which one end of a slack adjuster is to be mounted and a second end formed with a second bearing surface adapted for engagement with a bearing pin to be employed to connect an opposite end of the slack adjuster to a clevis. The second end of the gage additionally includes indicating means for indicating when the position of the clevis lengthwise of its supporting push rod provides a given angle between an axis of such push rod and a line drawn through the centers of the control shaft and the bearing pin.

The gage may be sized for use with a slack adjuster having a given distance between centers of its points of connection to the control shaft and bearing pin. In a first alternative form, the gage is provided with a further second bearing surface and a further indicating means to adapt it for use with two sizes of slack adjusters or a single slack adjuster having two alternatively usable points of connection to the clevis. In a second alternative form of the invention, the gage is provided with a member, which defines the second bearing surface and indicating means and is supported by the body of the gage to arrange the second bearing surface and indicating means in at least two chosen position lengthwise of such body.

BRIEF DESCRIPTION OF THE DRAWINGS

The nature and mode of operation of the present invention will now be more fully described in the following detailed description taken with the accompanying drawings wherein:

FIG. 3 is a side elevational view of a gage formed in accordance with the present invention;

FIG. 4 is a sectional view taken generally along the line 4—4 in FIG. 3;

FIG. 7 is a side elevational view of an alternative gage construction; and

FIG. 8 is a side elevational view of a further alternative gage construction.

DETAILED DESCRIPTION

Figure 1:
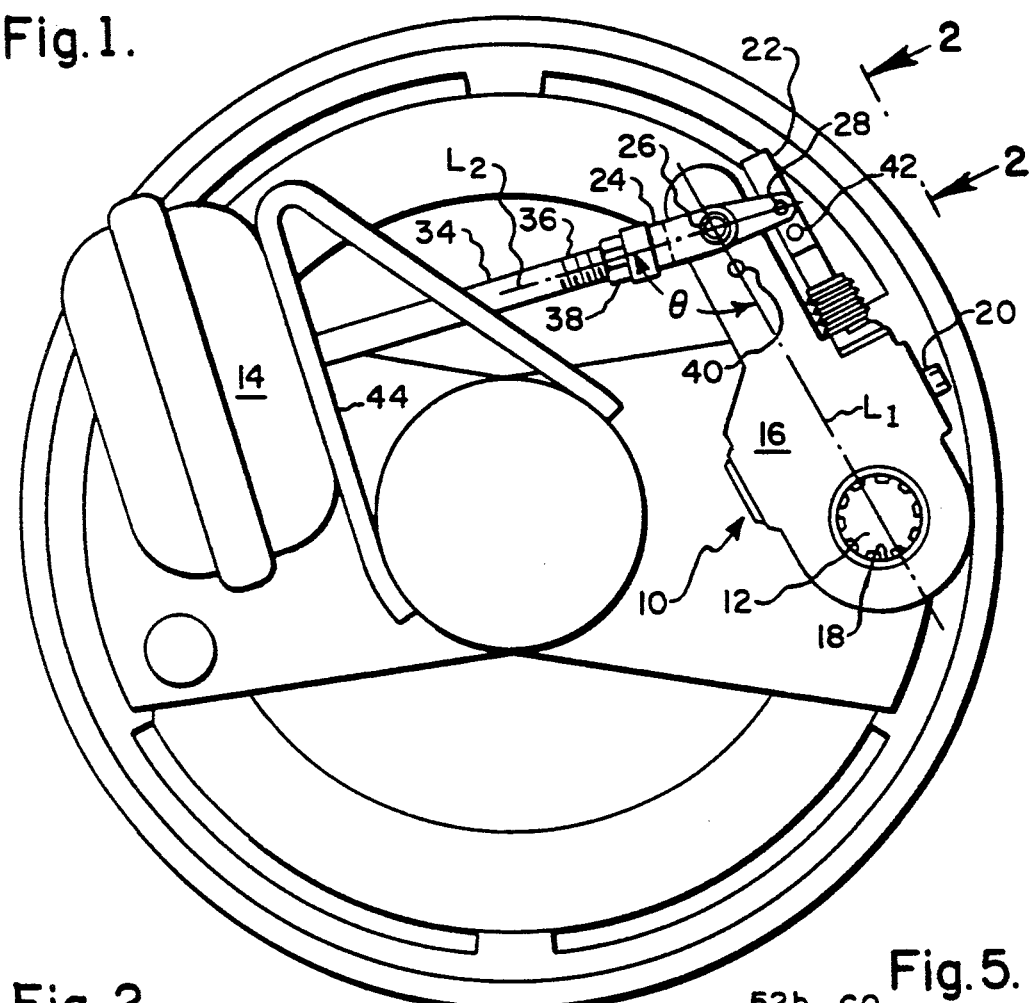
FIG. 1 is a view illustrating an automatic slack adjuster of conventional construction installed in association with a vehicle brake operating system.

Reference is first made to FIG. 1, wherein an automatic slack adjuster 10 is shown as being spline connected to an end of a brake control or cam shaft 12 for purposes of imparting brake setting/releasing rotations to the control shaft under the control of a pneumatic actuator 14.

Figure 2:
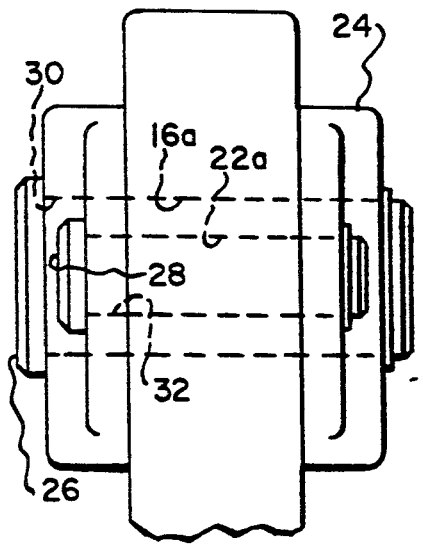
FIG. 2 is a fragmentary end view, as viewed along the line 2—2 in FIG. 1.

Adjuster 10 is conventional from the standpoint that it generally includes a housing 16, which mounts a rotatable gear 18 sized and shaped to slidably receive and be keyed for rotation with control shaft 12, a rotatable manual adjuster 20 operably connected to the rotatable gear via a worm gear, not shown, and a slidable adjuster link 22. Housing 16 an adjuster link 22 are each provided with at least one bore opening, shown only at 16a and 22a in FIG. 2, by which they are removably connected to a clevis 24 via bearing and connecting pins 26 and 28, which are respectively removably received within clevis bore openings 30 and 32. Clevis 24 is in turn adjustably and removably fixed to a reciprocating push rod 34 of actuator 14, such as by a threaded connection 36 and a lock or jam nut 38. Prior automatic adjusters of the type illustrated may have their housings and adjuster links provided with an additional set of bore openings 40 and 42 for receiving bearing and connecting pins 26 and 28, respectively, in order to vary the moment arm through which push rod 34 acts about the axis of shaft 12; it being understood that actuator 14 is typically adjustably mounted on a supporting bracket 44 to permit displacements of push rod 34 into selected positions parallel to that shown in FIG. 1.

With automatic slack adjusters of the type described, it is critical to their proper operation that, when they are coupled to push rod 34 and mounted on shaft 12, a line $L_1$ drawn through the centers of the shaft and thus gear and the bore opening receiving bearing pin 26 forms some predetermined angle $\theta$ with a line $L_2$ drawn axially of the push rod and through the centers of clevis bore openings 30 and 32. Depending on application requirements, angle $\theta$ will typically lie within the range of between 90° and 106° for the illustrated brake release position of slack adjuster 10. Divergence from the predetermined angle $\theta$ upon installation of the slack adjuster will result in incorrect initial positioning of adjuster link 22 relative to housing 16 and resultant improper brake slack adjustments.

Reference is now made to FIGS. 3 and 4, wherein a gage formed in accordance with the present invention is generally designated as 50 and shown as being in the form of an elongated body 52 of molded plastic or other suitable material having first and second or opposite ends 52a and 52b. First end 52a is shown as being provided with a cylindrical mounting opening 54 in which a tubular bearing member 56 is removably received in a relatively tight, slide fitting relationship. The inner cylindrical surface 56a of bearing member 56 defines a first bearing surface sized to rotatably and slidably receive shaft 12 of given diameter when adjuster 10 is removed therefrom. It is contemplated that bearing member 56 may be one of a set of bearing members, not shown, having differing internal diameters, as required to permit gag 50 to be rotatably coupled to a plurality of differing sized shafts. Preferably, mounting opening 54 would be sized to rotatably receive the largest diameter shaft expected to be encountered during use and for such case bearing member 56 would be omitted or removed to permit the mounting opening to serve as the first bearing surface. While the provision of a cylindrical bearing surface is preferable in that it serves to retain the rotatable coupling or connection between gage 50 and shaft 12 when a user's hand is momentarily removed from the gage, it is contemplated that bearing surfaces defined by bearing member 56 or mounting opening 54 may extend through an arcuate extent of less than 180°, so long as the arcuate extent is sufficient to ensure rotational contact between gage 50 and shaft 12. It is also preferable to provide bearing member 56 with an axial length substantially greater than the thickness of body 52, as shown in FIG. 4, in order to ensure against tilting of the axis of opening 54 and/or surface 56 relative to the axis of shaft 12, during use of the gage.

Body second end 52b is provided with a second bearing surface preferably defined by a concave recess 58 sized to snugly, rotatably receive bearing pin 26 and an indicating means defined at least in part by an indicator opening 60 corresponding in size to bore opening 32 of clevis 24. The indicating means would preferably further include a projection 62 arranged adjacent indicator opening 60 and to project from body second end 52b in a direction away from recess 58. Preferably, the tip or free end of projection 62 is bisected by a line extending through the centers of indicator opening 60 and recess 58. The thickness of second end 52b is required to be such that it may be freely slidably inserted between the legs of clevis 24. Preferably, the thickness of second end 52b is greatest adjacent bearing surface 58, as shown in FIG. 4, in order to maximize surface to surface contact between the bearing surface and bearing pin and prevent tilting of gage 50 relative to the axis of pin 26.

Recess 58, indicator opening 60 and bearing surface 56a are relatively arranged, such that when the recess and the bearing surface engage with bearing pin 26 and shaft 12, respectively, and the indicator opening is aligned with clevis bore opening 32, clevis 24 is adjustably positioned lengthwise of push rod 34 to provide angle $\theta$ between line $L_2$ and a line drawn through the center of curvature of recess 58 and the center of curvature of bearing surface 56a. Thus, with this adjusted position of clevis 24, angle $\theta$ between lines $L_1$ and $L_2$ will be automatically established upon subsequent mounting of adjuster 10 on shaft 12 and the insertion of pins 26 and 28 through openings 16a and 30 and through openings 22a and 32, respectively.

Figure 5:
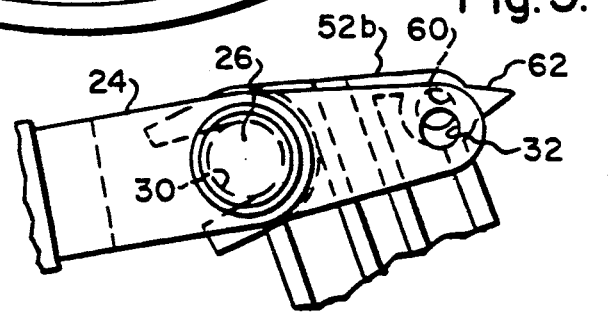
FIGS. 5 and 6 are fragmentary side elevational views illustrating utilization of the gage of FIG. 3.
Figure 6:
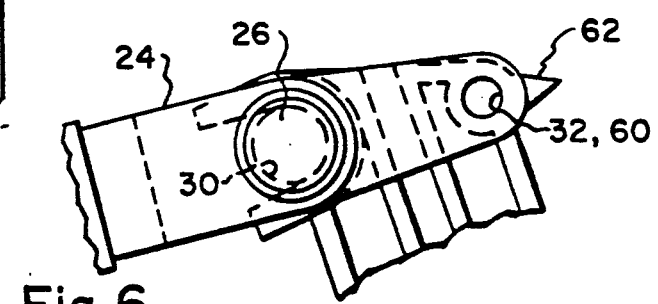

FIGS. 5 and 6 illustrate the method of employing gage 50 to effect proper positioning of clevis 24 axially of push rod 34 in order to achieve the desired angle $\theta$ upon installation of slack adjuster 10. It will be understood that use of gage 50 first involves the sliding of bearing surface 56a onto shaft 12 and then adjusting clevis 24 as required to permit bearing pin 26 to be positioned such that when body 52 is rotated in a counterclockwise sense, as viewed in FIGS. 5 and 6, second end 52b is insertable between the spaced legs of the clevis for receipt of the bearing pin within recess 58, as generally depicted in FIG. 5. The relative positioning of indicator opening 60 relative to bore opening 32 is then observed, body 52 swung clockwise to remove second end 52b from within clevis 24 and the clevis adjusted lengthwise of push rod 34 with a view towards moving the clevis sufficiently to arrange bore opening 32 for alignment with indicator opening 60 when second end 52b is again rotated counterclockwise for insertion between the legs of the clevis. Typically, this procedure must be repeated at least several times before accurate alignment of indicator opening 60 and bore opening 32, as indicated in FIG. 6, can be achieved. The presence of projection 62 is of great assistance to a user in making initial rough adjustments of clevis 24, particularly under poor lighting conditions, as required to quickly bring indicator opening 60 and bore opening 32 in proximate alignment. Final alignment may be achieved visually or by inserting connecting pin 28 through openings 32 and 60. After clevis 24 has been properly positioned lengthwise of push rod 34, nut 38 is tightened in order to lock the clevis in its adjusted position.

FIG. 7 illustrates an alternative gage construction in which elements similar to those of gage 50 are designated by like primed numerals. Gage 50' differs from gage 50 in the provision of a further second bearing surface 68 and further indicating means including a further indicator opening 70 and a further projection 72, which are intended to be employed in the positioning of clevis 24 when the latter is desired to be connected to slack adjuster 10 by inserting pins 26 and 28 into the additional set of openings 40 and 42. Thus, a single gage 50' may be used for mounting a slack adjuster of the type illustrated in FIG. 1 in place of two differently sized gages of the type shown in FIG. 3.

FIG. 8 illustrates a further alternative gage construction in which elements similar to those of gage 50 are designated by like double primed numerals. Gage 50" differs from gage 50 in that its second bearing surface 58", indicator opening 60" and projection 62" are defined by a member 80 formed separately from second end 52b" and selectively mounted thereon in at least two positions by suitable mounting means, such as may be defined by two or more mounting openings 82 formed in second end 52b" and a threaded fastener 84 removably insertable through openings 82 for receipt within a threaded bore, not shown, formed in member 80. As will be apparent, two of mounting openings 82 may be arranged, such that when fastener 84 is alternatively positioned therein, second bearing recess 58" may be positioned lengthwise of body 52" for use in place of recesses 58' and 68 of gage 50'.

In all forms of the present gage depicted in the drawings, the second bearing surface is defined by recesses 58, 58', 68 and 58" having arcuate lengths equal to and preferably slightly less than 180°. in order to permit gages 50, 50' and 50" to be quickly swung into and out of clevis 24 during the adjustment operation. It will, however, be understood that such recesses may be replaced by cylindrical bore openings, but for such case bearing pin 26 would have to be repeatably removably inserted therein between adjustments of clevis 24.

What is claimed is:

1. A gage for use in mounting a slack adjuster having one end formed with a bore opening adapted to removably receive a brake control shaft and an opposite end having a bore opening adapted to be removably receiving a bearing pin for rotatably coupling said opposite end to a clevis of a brake actuating push rod, said clevis being adjustable lengthwise of said push rod, said gage comprising:

an elongated body having first and second ends, said first end having a first bearing surface adapted to engage with an outer surface of said control shaft, and said second end having a second bearing adapted for engagement with said bearing pin and indicating means for indicating when the position of said clevis lengthwise of said push rod provides a given angle between an axis extending lengthwise of said push rod and a line drawn through centers of said control shaft and said bearing pin.

2. A gage according to claim 1, wherein said second bearing surface is of arcuate configuration.

3. A gage according to claim 1, wherein said first bearing opening is of cylindrical configuration.

4. A gage according to claim 1, wherein said first end has a mounting opening and said first bearing surface is defined by a bearing member removably inserted within said mounting opening, and said bearing member is sized and shaped to rotatably support said body on said outer surface of said control shaft.

5. A gage according to claim 4, wherein said bearing member is in the form of a generally cylindrical sleeve insert.

6. A gage according to claim 1, wherein said second end has a further bearing surface and a further indicating means arranged parallel to said bearing surface and said indicating means.

7. A gage according to claim 6, wherein said second and further bearing surfaces are of arcuate configuration.

8. A gage according to claim 6, wherein said first bearing opening is of cylindrical configuration.

9. A gage according to claim 6, wherein said first end has a mounting opening and said first bearing surface is defined by a bearing member removably inserted within said mounting opening, and said bearing member is sized and shaped to rotatably support said body on said outer surface of said control shaft.

10. A gage according to claim 9, wherein said bearing member is in the form of a generally cylindrical sleeve insert.

11. A gage according to claim 1, wherein said second end includes a member defining said second bearing surface and said indicating means, and mounting means for mounting said member on said body.

12. A gage according to claim 11, wherein said mounting means selectively mounts said member in at least two positions spaced apart lengthwise of said body for varying the distance between said second bearing surface and said indicating means relative to said first bearing surface.

13. A gage according to claim 12, wherein said first end has a mounting opening and said first bearing surface is defined by a bearing member removably inserted within said mounting opening, and said bearing member is sized and shaped to rotatably support said body on said outer surface of said control shaft.

14. A gage according to claim 12, wherein said slack adjuster is an automatic slack adjuster including an adjustment link formed with a bore opening and said clevis includes a bore opening and a connecting pin removably receivable within said bore openings of said link and clevis, and said indicating means includes an indicator opening adapted for alignment with said bore opening of said clevis.

15. A gage according to claim 14, wherein said indicating means further includes a projection arranged adjacent said indicator opening to project from said member in a direction away from said second bearing surface.

16. A gage according to claim 1, wherein said slack adjuster is an automatic slack adjuster including an adjustment link formed with a bore opening and said clevis includes a bore opening and a connecting pin removably receivable within said bore openings of said link and clevis, and said indicating means includes an indicator opening adapted for alignment with said bore opening of said clevis.

17. A gage according to claim 16, wherein said first end has a mounting opening and said first bearing surface is defined by a bearing member removably inserted within said mounting opening, and said bearing member is sized and shaped to rotatably support said body on said outer surface of said control shaft.

18. A gage according to claim 16, wherein said second end includes a further second bearing surface and a further indicating means including an indicator opening, said second and further second bearing surfaces include arcuate portions, and a line drawn through a center of curvature of said arcuate portion of said further second bearing surface and said further indicator opening is parallel to a line drawn through a center of curvature of said arcuate portion of said second bearing surface and said indicator opening.

19. A gage according to claim 18, wherein said indicating means and said further indicating means each additionally include projections disposed adjacent said indicator opening and said further indicator opening and to project in directions away from said second bearing surface and said further second bearing surface, respectively.

20. A gage according to claim 19, wherein said first end has a mounting opening and said first bearing surface is defined by a bearing member removably inserted within said mounting opening, and said bearing member is sized and shaped to rotatably support said body on said outer surface of said control shaft.

* * * * *